A. E. EDSTROM.
DRAFT ATTACHMENT.
APPLICATION FILED APR. 1, 1920.
1,343,908.
Patented June 22, 1920.
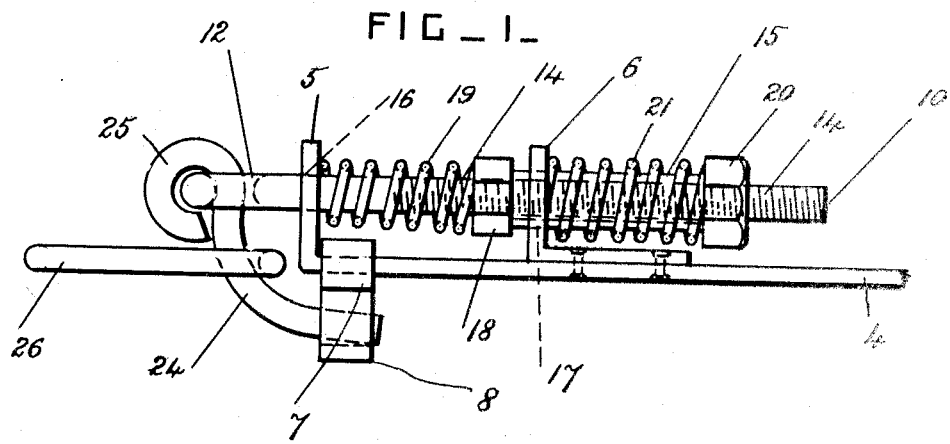
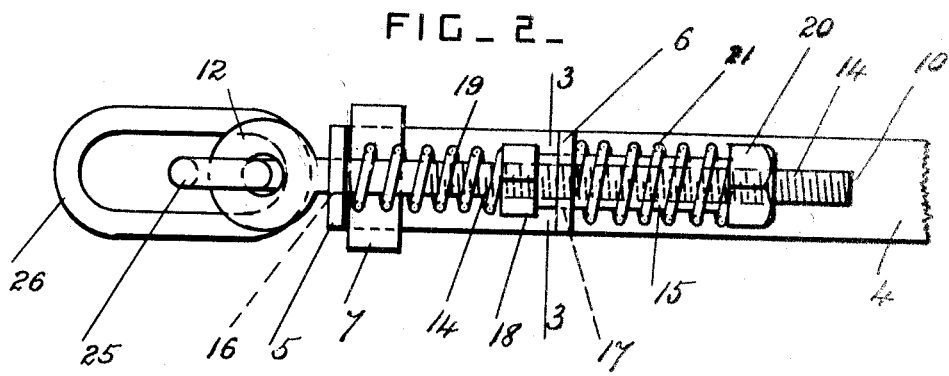
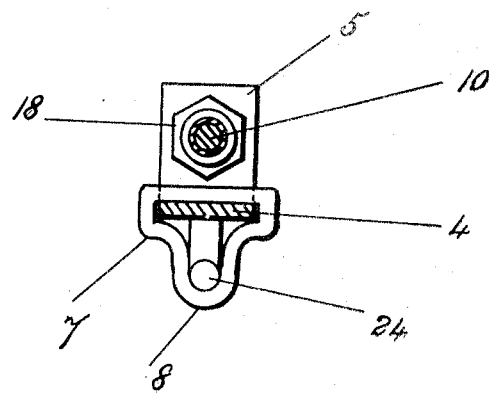
Inventor.
Arthur E. Edstrom
by Herbert W. Jenner.
Attorney.

UNITED STATES PATENT OFFICE.

ARTHUR E. EDSTROM, OF ELBOW LAKE, MINNESOTA.

DRAFT ATTACHMENT.

1,343,908.  Specification of Letters Patent.  Patented June 22, 1920.

Application filed April 1, 1920. Serial No. 370,549.

*To all whom it may concern:*

Be it known that I, ARTHUR E. EDSTROM, a citizen of the United States, residing at Elbow Lake, in the county of Grant and State of Minnesota, have invented certain new and useful Improvements in Draft Attachments, of which the following is a specification.

This invention relates to draft attachments for plows and other similar agricultural implements, which attachments yield when the resistance to the tractive force exceeds a predetermined limit; and it consists in the novel construction and combination of the parts hereinafter fully described and claimed.

In the drawings, Figure 1 is a side view of a draft attachment constructed according to this invention. Fig. 2 is a plan view of the same. Fig. 3 is a cross-section through the device, taken on the line 3—3 in Fig. 2.

A draft bar 4 is provided, and is attached at one end to the plow or other implement in any approved manner. A lug 5 is formed on the free end of the bar 4, and a second lug 6 is secured to the bar parallel to the lug 5, and at a predetermined distance behind it. A clip 7 is slidable on the bar 4 between the lugs 5 and 6, and it has an eye 8 at its lower part.

A screwthreaded rod 10 is provided, and has an eye 12 at its front end. The rear and middle portions 14 of the rod are screwthreaded, and 15 is a tube which is freely slidable over the screw-threaded portion of the rod. The front end portion of the rod 10 is slidable in a hole 16 in the front lug 5, and the tube 15 is slidable in a hole 17 in the rear lug 6. A nut 18 is screwed on the rod and is arranged in the space between the two lugs 5 and 6, and a helical spring 19 is arranged between the nut 18 and the front lug 5, around the rod.

A nut 20 is screwed on the rear end portion of the rod, and the nuts 18 and 20 engage with the ends of the tube or distance-piece 15. A helical spring 21 is arranged around the tube 15 between the rear nut 20 and the rear lug 6.

A curved releasing pin 24 is provided and is slidable longitudinally in the eye 8 of the clip 7, and the pin 24 has an eye 25 at its front end which is pivoted to the eye 12 on the front end of the rod 10. A link 26 engages pivotally with the middle part of the curved releasing pin 24, and the tractor or draft-horse is connected to this link. The two springs 19 and 21 are adjusted by means of their nuts so that the rod 10 will slide forwardly in the lugs to a sufficient extent to withdraw the releasing pin 24 from the eye 8 when the plow strikes a large rock, or when the normal resistance is otherwise exceeded. The use of two springs arranged one behind the other on a single rod enables a suitable adjustment of the device to be made, and at the same time provides a device which is relatively small, and not likely to get out of order or to be broken.

The pressure of the releasing pin holds the slidable clip against the front lug when the device is at work, and the clip can be slid rearwardly by hand to disengage the tractor when the tractor is stationary and is not pulling on the link.

What I claim is:

1. In a draft attachment, a draft bar having two lugs arranged one behind the other, a clip provided with an eye and slidable on the said bar between its two lugs, a screwthreaded rod slidable in holes in the said lugs, a releasing pin pivoted to the front end portion of the said rod and engaging with the eye of the clip, a traction device engaging with the middle part of the releasing pin, springs encircling the said rod with their front ends bearing against the respective lugs, and nuts screwed on the rod and adapted to adjust the strength of the springs.

2. In a draft attachment, a draft bar having two lugs arranged one behind the other, a clip provided with an eye and slidable on the said bar between its two lugs, a screwthreaded rod slidable in holes in the said lugs, a releasing pin pivoted to the front end portion of the said rod and engaging with the eye of the clip, a traction device engaging with the middle part of the releasing pin, a tube slidable over the screwthreaded portion of the said rod and slidable in a hole in the rear lug, adjusting nuts screwed on the said rod and arranged one at each end of the said tube, a spring arranged between the front lug and the front nut around the said rod, and a second spring arranged around the said tube between the rear lug and the rear nut.

In testimony whereof I have affixed my signature.

ARTHUR E. EDSTROM.